Patented July 9, 1935

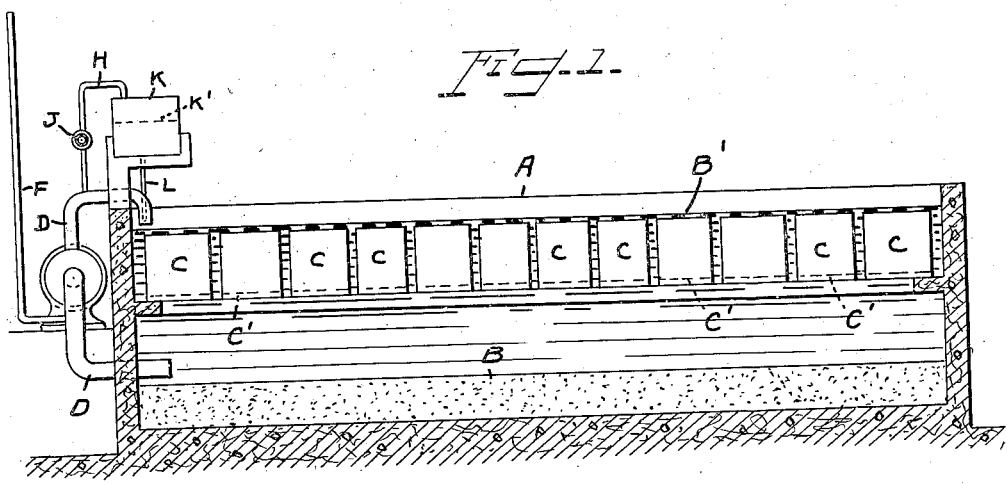
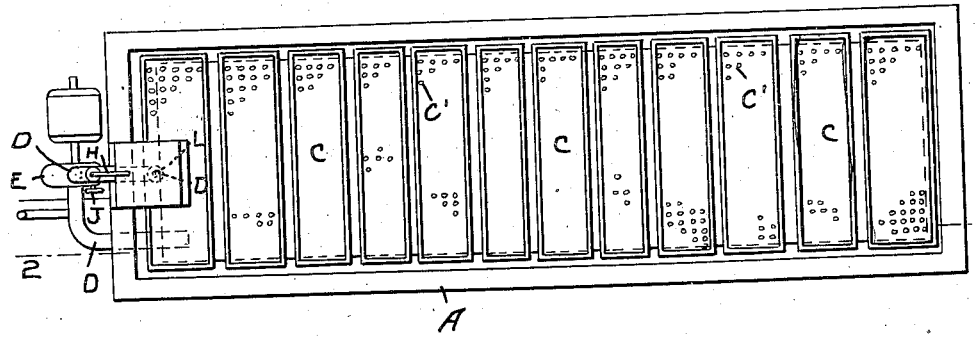
Pierre Max Raoul Salles
Mathieu René Loubatie
INVENTORS

2,007,479

UNITED STATES PATENT OFFICE 2,007,479

MANUFACTURE OF ORGANIC IODINE COMPOUNDS

Pierre Max Raoul Salles, Cauderan, and Mathieu René Loubatié, Arcachon, France

Application March 21, 1930, Serial No. 437,932 In France May 25, 1929

8 Claims. (Cl. 119—4)

This invention relates to the manufacture of organic iodine compounds as integral parts of living organisms, and has for its object to provide a process which enables very large quantities of iodine to be fixed or stored up in the organs of living creatures, as for example marine shellfish.

It is, of course, known that marine animals contain appreciable traces of iodine which play a very important part in their ordinary nourishment, for this iodine continuously takes part in the life cycle and consequently remains immediately assimilable.

It is advantageous to recall here that iodine is indispensable to the life of some living creatures, and the object we have sought has been to cause marine shellfish to assimilate by means of the process forming the subject-matter of the invention, quantities of iodine several hundred times greater than those naturally contained in these animals.

The purpose of the invention is to deliver for consumption living and super-iodized foods.

Generally speaking, the process consists of the following:—

1. In propagating and cultivating in a reservoir a marine flora which is constantly charged with iodine in solution to form a developing medium for the shellfish.
2. In supplying to this medium vegetable and animal micro-organisms which are known elements of deep sea plankton.
3. In then placing the shellfish to be treated in this medium for any suitable time.

Since any suitable device may serve for carrying the process into practice, we will describe by way of example that which we have employed for our researches.

Before putting the apparatus into operation, a quantity of shellfish is introduced into the racks B, mussels for example, equal to about 2% of the weight of the water content of the tank, and they are allowed to die and decompose, which takes about five or six days.

The racks are then withdrawn, cleared of the empty shellfish and very carefully cleaned.

Then the water of the tanks contains in suspension dead and decomposed organic matter resulting from the dead bodies of the shellfish, and also the germs or seeds of marine flora.

In order that the invention may be clearly understood and readily carried into practice, we have appended hereto one sheet of drawings, in which the same is illustrated by way of example and in which:—

Figure 1 is a diagrammatic sectional elevation on line 2—2 Figure 2 of a simple form of apparatus according to the invention, and Figure 2 is a plan view of a part thereof.

The drawing shows a cement tank A at the bottom of which there is provided a thick bed of sand B. The tank is filled with sea-water B' and has supported in its upper part a number of racks or trays C having perforated bottoms C', some only of the perforations being shown in the drawing.

Means are provided for circulating the water from the top to the bottom of the tank A, and such means comprise a pipe D having its mouth in the lower part of the tank and passing outside the tank to the top of the latter where it opens into the tank. A pump E is provided for forcing the liquid in circulation from the bottom to the top of the pipe.

Air is introduced into the pipe D through a pipe F for the purpose of aerating the liquid flowing therethrough.

A part of the water flowing through this circulation system is passed by way of a pipe H having a regulating cock J into a receiver K containing either mineral iodine in flakes or an iodine compound which is gradually dissolved in the circulating liquid. The solution K' thus formed is then returned, by a pipe L entering the return or upper end of the pipe D at its discharge end, to the principal mass of the circulating liquid, which is thus continuously and slightly iodized.

Things are left in this state for two or three days, the water becomes muddy and unpleasant, many small algae become attached to the walls of the tank and develop at the expense of the organic matter in suspension and in part resting on the sand at the bottom.

The water circulating apparatus is then put into operation and automatically the apparatus for injecting air and iodine, and it will be found that at the end of several days the liquid has become again limpid and odourless.

The racks filled with marine shellfish, for example, oysters, and some marine plants, laminaria or fucus, are then placed on the sand at the bottom. The function of the latter is to import into the tank all the elements of living nourishment immediately made use of by the shellfish, elements which reproduce and multiply particularly at the expense of the vegetation.

The oysters placed in the tank live in surroundings slightly and constantly iodized, and independently of the iodine that they assimilate directly under these conditions, they feed on the crustaceans and miscroscopic animals which constitute the plankton.

These little crustaceans and micro-organisms have themselves assimilated the iodine carried by the vegetation which has served as their food.

The greater part of the iodine injected into the tank is absorbed almost instantly by the vegetation and the organized living centre constituting the plankton; the oysters than assimilate it easily since it is already part of a living organism.

The oysters thus fix or hold very great quantities of iodine without being in the least inconvenienced; they develop fat and are perfectly vigorous; their taste is not in the least affected.

The duration of the treatment depends on the quantity of iodine which it is desired they should assimilate. We would observe that in five days we have obtained fixation of a quantity of iodine two hundred times greater than the quantity contained in the natural state, and much more by continuation of the treatment.

The quantity of iodine injected at the beginning of the preparation of the tank is about sixty grams per cubic metre, and subsequently it depends upon the quantity of iodine which it is desired to fix and on the state in which the shellfish are at the moment they are introduced into the tank. If they are covered with marine vegetation which itself absorbs iodine which would disappear from the tank when the oysters are taken out, it is evident that one must add more iodine, to compensate for the loss, than if the shellfish are perfectly clean.

Actual experience will readily determine the proper quantity of iodine to inject.

One may also inject iodine or any iodine derivative in solution in an alkaline iodide.

The advantages of the process lie in the possibility of delivering for consumption super-iodized shellfish, that is to say, shellfish containing quantities of organic iodine which are assimilated and in the living state, and not organic iodine in the chemical sense of the term, several hundred times greater than in the natural state.

The food value of these shellfish is a function of their contents of iodine.

The other advantages resulting from the application of the process reside in the absolute certainty that the shellfish thus treated are healthy, the life of pathogenic and colibacillic micro-organisms being incompatible with the presence of these large quantities of iodine and the water constituting the developing medium which is constantly under the action of the free iodine.

Finally the vitality of the animals thus treated being considerably increased, this particularly favours their transportation.

What we claim is:—

1. Process for the production of organic compounds of iodine, consisting in artificially promoting the assimilation and accumulation of excess of iodine in the organs of living shellfish, by placing said shellfish in a developing medium artificially enriched with iodine.

2. Process for the production of organic compounds of iodine, consisting in administering living and super-iodized foods to living shellfish whereby an excess of iodine becomes assimilated and accumulated in the organs of said shellfish.

3. Process for the production of organic compounds of iodine, including the steps of propagating and cultivating in a reservoir marine flora which are constantly charged with iodine in solution, and then placing marine shellfish in said reservoir for development amongst said flora.

4. Process for the production of organic compounds of iodine, including the steps of propagating and cultivating in a reservoir marine flora which are constantly charged with iodine in solution, placing marine shellfish in said reservoir for development amongst said flora, and supplying the marine flora with vegetable and animal micro-organisms.

5. Apparatus for the production of organic compounds of iodine, including a tank having a bed of sand and containing sea-water, racks disposed in the water in the upper part of the tank, apparatus for extracting water from and returning it to the tank in such manner that water moves from top to bottom in the tank, means for aerating the extracted water, and means for extracting a portion of the extracted water and returning it to the tank, this means being of such structure that the second extracted water may be iodized before it is returned to the tank.

6. A method of producing organic compounds of iodine as set forth in claim 1, including the step of circulating said developing medium while the shell-fish are therein, and aerating said developing medium as it circulates.

7. A method of producing organic compounds of iodine as set forth in claim 1, including the steps of allowing shellfish to die and decompose in said medium and removing the shells of said shellfish after decomposition, cultivating marine flora in said medium, subsequently circulating and aerating said medium, and supplying said marine flora with iodine in solution in said medium, whereafter other shellfish to be treated are introduced into said medium.

8. A method of producing organic compounds of iodine as set forth in claim 1 including the step of circulating the said medium while the shellfish to be treated are therein.

PIERRE MAX RAOUL SALLES.
MATHIEU RENÉ LOUBATIÉ.